MICROWAVE NOISE SOURCE

Filed May 12, 1950

INVENTOR
Harwick Johnson
BY
J. L. Whittaker
ATTORNEY

MICROWAVE NOISE SOURCE

Filed May 12, 1950 2 Sheets-Sheet 2

INVENTOR
Harwick Johnson
BY J. L. Whittaker
ATTORNEY

United States Patent Office 2,716,192

Patented Aug. 23, 1955

2,716,192

MICROWAVE NOISE SOURCE

Harwick Johnson, Princeton, N. J., assignor, by mesne assignments, to the United States of America as represented by the Secretary of the Army Application May 12, 1950, Serial No. 161,501

1 Claim. (Cl. 250—36)

This invention relates to microwave noise sources.

Microwave noise sources have recently achieved considerable importance, particularly for their use in measuring instruments. It is desirable for a noise source in the microwave region, especially for testing purposes, to generate a reasonably high amplitude of noise, to be broad band and stable, and to provide a good noise standard. A gaseous discharge tube has been suggested as one good source for microwave noise. For example, see the article by W. W. Mumford, in volume 28 of the Bell System Technical Journal, at pages 608 et seq., entitled, "A broad band microwave noise source."

It is an object of the present invention to provide a broad band, stable microwave noise generator.

It is a further object of the invention to provide an arrangement in which the noise source is matched, over a broad band without the necessity of tuning screws or other tuning devices, to a waveguide.

Another object of the invention is to improve the generation of noise in the microwave region.

These and other objects, advantages, and novel features of the invention will be more apparent from the following description in which like reference numerals refer to like parts and in which.

Figure 3:
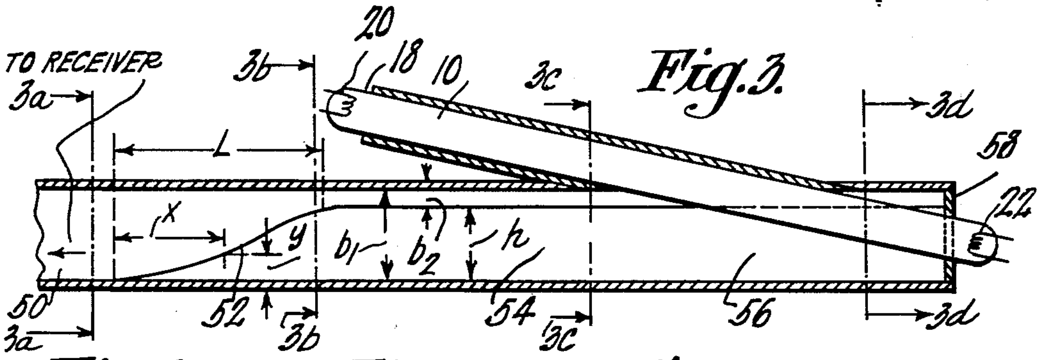
Fig. 3 is a longitudinal cross-sectional view of another embodiment of the invention using ridge waveguide.
Figure 3A:
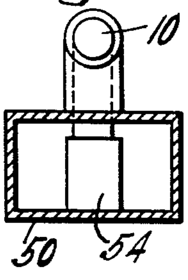
Figure 3B:
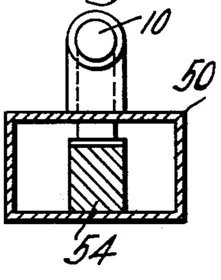
Figure 3C:
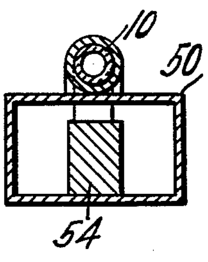
Figure 3D:
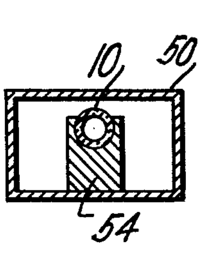
Figures 4, 5, 6:
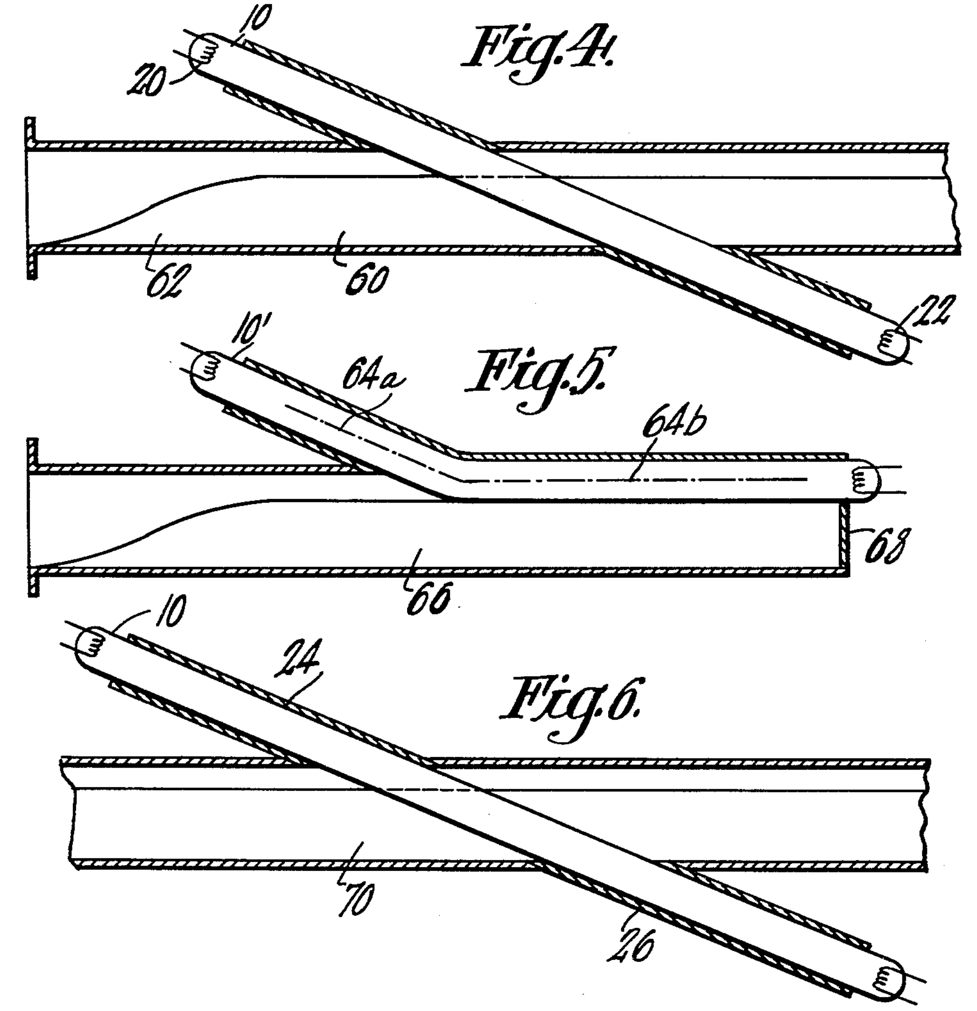

Figs. 3*a*, *b*, *c*, and *d* are transverse cross-sectional views along the lines *a—a*, *b—b*, *c—c*, and *d—d* of Fig. 3;

Fig. 4 is a longitudinal cross-sectional view of still another embodiment of the invention in which ridge waveguide is employed and suitable as a "transmission type" noise source.

Figure 7:
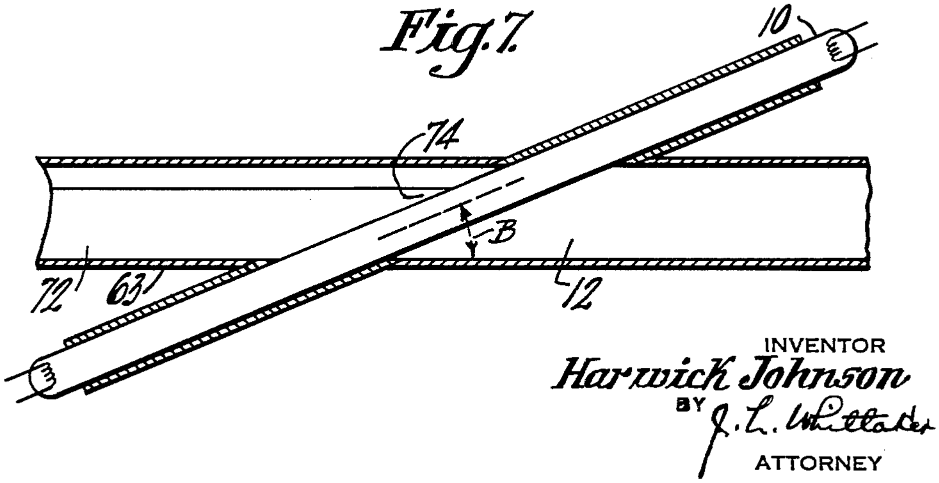

Fig. 5 is a longitudinal cross-sectional view of another embodiment of the invention in which the tube has a bent axis and suitable as a "termination type" noise source;

Fig. 6 is a longitudinal cross-sectional view of another embodiment of the invention using ridge waveguide and which is a "transmission type" noise source; and Fig. 7 is a further embodiment of the invention in which ridge waveguide is employed with the ridge terminated in reverse inclination from that of Fig. 4.

In accordance with the invention, a gaseous discharge tube is inserted through a hollow pipe waveguide with its axis at a small angle with the waveguide axis. By a small angle, it will be understood that the angle is less than about 15°. It is found that larger angles produce inferior results. It has been found by applicant that by arranging the gas discharge tube in the waveguide in accordance with the invention, one may obtain a microwave source which is matched over a very broad frequency band. For example, it is possible to match the source with a standing wave ratio of less than 1.1 through substantially the whole operating band of a rectangular waveguide from about one-half to about nine-tenths of the cutoff wavelength thereof. The insertion may be made in the H plane if desired, but it is found more efficient and gives a better match over a broader band, if the axis of the tube is inserted in the E plane.

Figures 1, 2:
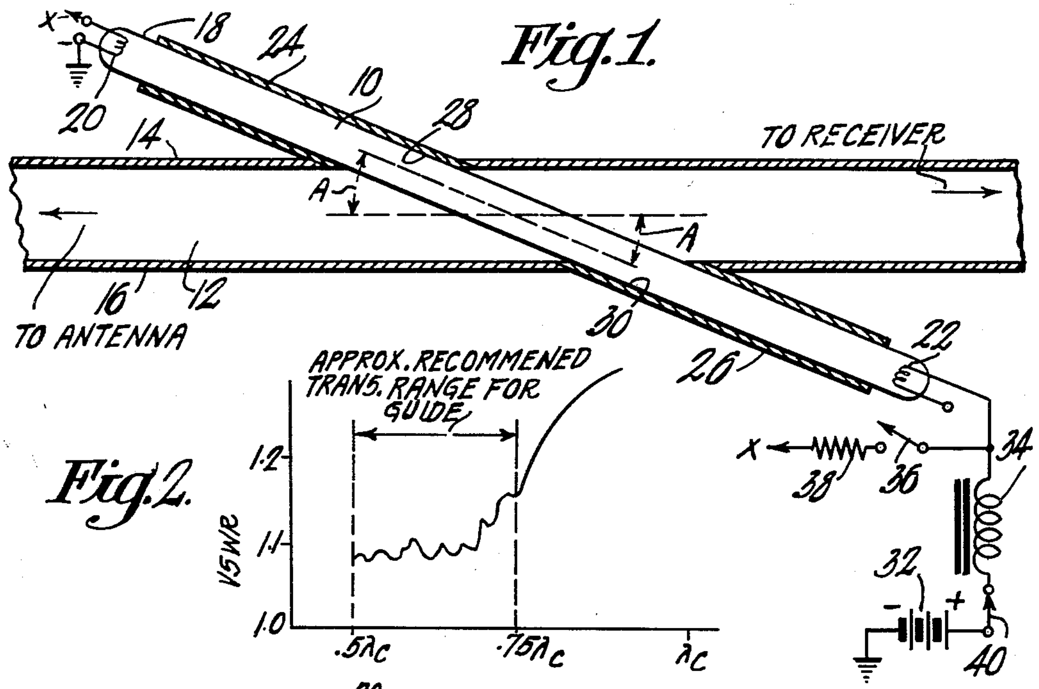
Fig. 1 is a longitudinal cross-sectional view of one embodiment of the invention.
Fig. 2 is a typical idealized plot showing standing wave ratio plotted against wavelength in terms of the cutoff wavelength for the arrangement of Fig. 1.

Referring more particularly to Fig. 1, an elongated gaseous discharge tube 10 is inserted through a rectangular waveguide 12. In the view of Fig. 1, the broad walls 14 and 16 of waveguide 12 are seen in section. The waveguide 12 is dimensioned to propagate over a prescribed frequency range only the dominant mode. The tube 10 may be constructed after the fashion of a conventional fluorescent lamp. The fluroescent wall coating may be omitted or not, as desired. Thus tube 10 has a dielectric envelope 18 of glass in this instance, a filament 20, and a second filament 22 at the opposite end of the tube. The axis of tube 10 is inclined at an angle A to the axis of waveguide 12. For good results, the smaller angle between the axes, as angle A, should be as small as conveniently possible and should not be more than about 15°. Tube 10 passes centrally through waveguide 12 in the plane of the electric vector, or in the E plane. This is the plane which passes also through the longitudinal axis of waveguide 12. Two metallic shields 24 and 26 surround tube 10 on the exterior of waveguide 12 extending from the apertures 28 and 30, respectively through which the tube 10 passes in waveguide walls 14 and 16 respectively.

In operation, the circuit schematically illustrated in Fig. 1 may be employed. A source of direct current voltage 32 is connected through an inductor 34, a single-pole single-throw switch 36 and a resistor 38 to one side of the filament 20. The other side of filament 20 is connected to the negative terminal of the source 32. The filament 22 (which serves as an anode and need not be a filament) is connected to the junction between the switch 36 and inductor 34. To start operation of the tube, switch 36 is closed, causing a heating current to pass through filament 20. On opening the switch 36, an inductive "kick," because of the current through inductor 34, starts the current between the filament 22 serving as anode and the filament 20 which is now the cathode. The filament 20 continues to heat because of ion bombardment. A gas discharge is thus sustained in the tube 10. With the arrangement shown, one may have one end of waveguide 12 connected to an antenna and the other end thereof connected to a receiver. Before the tube 10 is started, energy from the antenna passes freely through waveguide 12 to the receiver. After the tube 10 is started, such energy is substantially completely absorbed in the tube 10. Furthermore, the tube 10 serves as a noise-generating source from which noise passes to the receiver. In the embodiment of Fig. 1, receiver and antenna may be interchanged from one end of the waveguide 12 to the other. The switch 40 may be opened when it is desired to turn off the tube 10.

A recommended operating range for a waveguide such as waveguide 12 is from about one-half the cutoff frequency to about three-fourths the cutoff frequency. It will be observed from Fig. 3, which is a characteristic plot for an arrangement such as that of Fig. 1, that over most of the recommended transmission range the standing wave ratio in waveguide 12 is less than 1.1 during operation of tube 10. The shields 24 and 26 are preferably small in diameter with respect to the cross-section dimension of the walls 14, 16. These shields, 24, 26, serve as waveguides less than cutoff so that they attenuate any energy within the transmission band of waveguide 12 which might otherwise escape in the wall openings.

Accordingly, the escape of energy is minimized. The electrodes 20, 22 are preferably outside the waveguide 12 so as not to interfere with waveguide transmission. Also, reflections are reduced with the electrodes outside the waveguide. The type of arrangement of Fig. 1 in which energy may be passed through the tube 10 at its point of coupling to waveguide 12 when the tube is not fired may be termed a "transmission type" noise source.

Referring now to Fig. 3, and Figs. 3*a*–3*d*, there is illustrated a so-called termination type arrangement. In the termination type arrangement, energy cannot be sent through the point where the tube 10 is inserted even though the tube is not fired. A rectangular waveguide 50 is connected to a receiver, as indicated. At the other end of a waveguide 50 there is a transition to ridge waveguide. The curve of the ridge transition portion 52 may be determined according to the formula $$\frac{y}{h}=\frac{1-k^{\operatorname{Sin}^2\left\{\frac{\pi}{2}\frac{x}{L}\right\}}}{1-k}$$

where $k$ is the ratio of the distance $b_2$ from the top of the ridge of waveguide 54 to the distance $b_1$, the height of the waveguide, $x$ is the distance from the point where the ridge commences longitudinally along the guide, $y$ is the height of the ridge at the distance $x$, L is the distance from where the ridge commences to the point at which the ridge reaches full height, and $h$ is the full maximum height of the ridge. The tube 10 may be inserted through the ridge portion 54 with its axis at an angle of less than 15° with the longitudinal axis of the waveguide portion 54. The tube may be operated in the same manner as its operation in Fig. 1.

During the passage of current through the tube, it generates microwave energy which matches to the waveguide over a very broad band and passes toward the receiver to the left as viewed in the drawing. At the right hand end of the section 54 beyond the point where the tube 10 is inserted into the ridge 56, the waveguide 54 may be terminated by a short-circuiting end plate 58. However, the end plate 58 may be omitted if desired, except that microwave energy will be propagated in a direction opposite to that of the receiver. In any event, during operation of tube 10, the energy propagated toward the receiver is substantially matched. Any energy propagated in the reverse direction from the receiver end of the waveguide is absorbed in the tube 10 because of its match during conduction to the waveguide portion 54.

Referring now more particularly to Fig. 4, there is shown a ridge waveguide section 60 and a transition section 62 which may be similar to the transition section of Fig. 3. Thus the arrangement of Fig. 4 to the left of the section 60 is substantially the same as in Fig. 3 to the left of the ridge waveguide section 54. In Fig. 4, the ridge 62 is terminated at the tube 10 in a planar portion parallel to the tube axis and normal to the narrow walls of the waveguide section 60. The operation of this arrangement is the same as those previously described, except that this section will operate as a transmission section. Also, the noise energy may be propagated to the right or the left or both, from the tube 10 as illustrated in Fig. 4, when the tube is conducting. When the tube is non-conducting, energy passes freely through that portion of the waveguide in which the tube is located, from one side to the other side thereof. Normally, however, because one wants a wider band over which the tube is matched, the connection to a receiver is made only on the ridge waveguide side.

Referring now more particularly to Fig. 5, there is a tube 10' having a longitudinal axis in the form of two lines **64*a* and 64*b*, which together form a bent or curved line. Portion 64*b* is substantially parallel to the longitudinal axis of the ridge waveguide portion 66. The arrangement of Fig. 5 is a termination type. An end plate 68 may be secured to the ridge waveguide section 66**. The operation of the device will be apparent from what has been said before.

Referring now more particularly to Fig. 6, the tube 10 may be inserted in a ridge waveguide 70 in the same manner as it is inserted in the rectangular waveguide of Fig. 1, that is parallel to or in the E plane. The ridge waveguide may continue in each direction. The tube also may be furnished with shields 24 and 26 as before. The operation of this embodiment is similar to that of the operation of the embodiment in Fig. 1 except that ridge waveguide is used throughout.

Referring now more particularly to Fig. 7, the tube 10 may be inserted at the boundary between rectangular waveguide 12 and a ridge waveguide portion 72. In Fig. 4, the ridge slopes at a small angle to the waveguide axis toward the bottom wall 63 in hill fashion. That is, as one progresses from the rectangular waveguide portion to the ridge waveguide portion the ridge rises gradually from wall 63. On the contrary, in Fig. 7, the ridge terminates with a slope in the reverse direction, so that the ridge itself terminates in an acute angle 74 above the wall 63. Thus the angle B between the axis of tube 10 and the rectangular waveguide 12 is less than 15° in Fig. 7, and also in Fig. 4, because one always measures the acute angle.

It will be apparent from the foregoing, that by following the invention, one may easily obtain a matched noise source which will be matched over a very broad frequency band. In the embodiment of Fig. 3, for example, applicant has found that the device is not only matched over the recommended transmission range but may be matched even beyond. In one case, the maximum voltage standing wave ratio (VSWR) was 1.05 over the recommended transmission range and the maximum VSWR was 1.08 to .9 of the cutoff frequency. It is unnecessary in following the invention in a microwave noise source arrangement to use tuning screws or other tuning devices to match the source, since the source is already matched over a sufficiently wide frequency band.

What is claimed is:

A microwave noise generator comprising a hollow pipe rectangular wave guide including an internal ridge wave guide section joined to said rectangular wave guide by a smooth continuously decreasing ridge portion, an elongated gas discharge tube having two dielectric envelope portions within said wave guide, one of said portions having its axis parallel to that of said rectangular wave guide, the other portion thereof being inclined from the longitudinal axis of the wave guide at an angle of more than zero but less than 15° and extending outside of said rectangular wave guide, an electrode at each end of said discharge tube for producing the discharge, said rectangular wave guide being closed near the end of the parallel portion of the said discharge tube, and means for shielding the outside portion of said discharge tube.

References Cited in the file of this patent

UNITED STATES PATENTS

| | | |
|---|---|---|
| 2,413,171 | Clifford et al. | Dec. 24, 1946 |
| 2,430,130 | Linder | Nov. 4, 1947 |
| 2,487,547 | Harvey | Nov. 8, 1949 |
| 2,577,118 | Fiske | Dec. 4, 1951 |

OTHER REFERENCES

Article, "A Broad Band Microwave Noise Source" by Mumford, published in Bell System Technical Journal, vol. 28, pp. 608–618. (Copy in 178–44–1D.)

Publication II, Montgomery, Technique of Microwave Measurements, vol. 11, Radiation Laboratory Series, Copyright 1947 McGraw Hill Co., pages 199–202 relied on. (Copy in Div. 69.)